Feb. 15, 1927.
G. R. WYLIE ET AL
1,617,362
EDUCATIONAL GAME
Filed Dec. 31, 1924  4 Sheets-Sheet 1
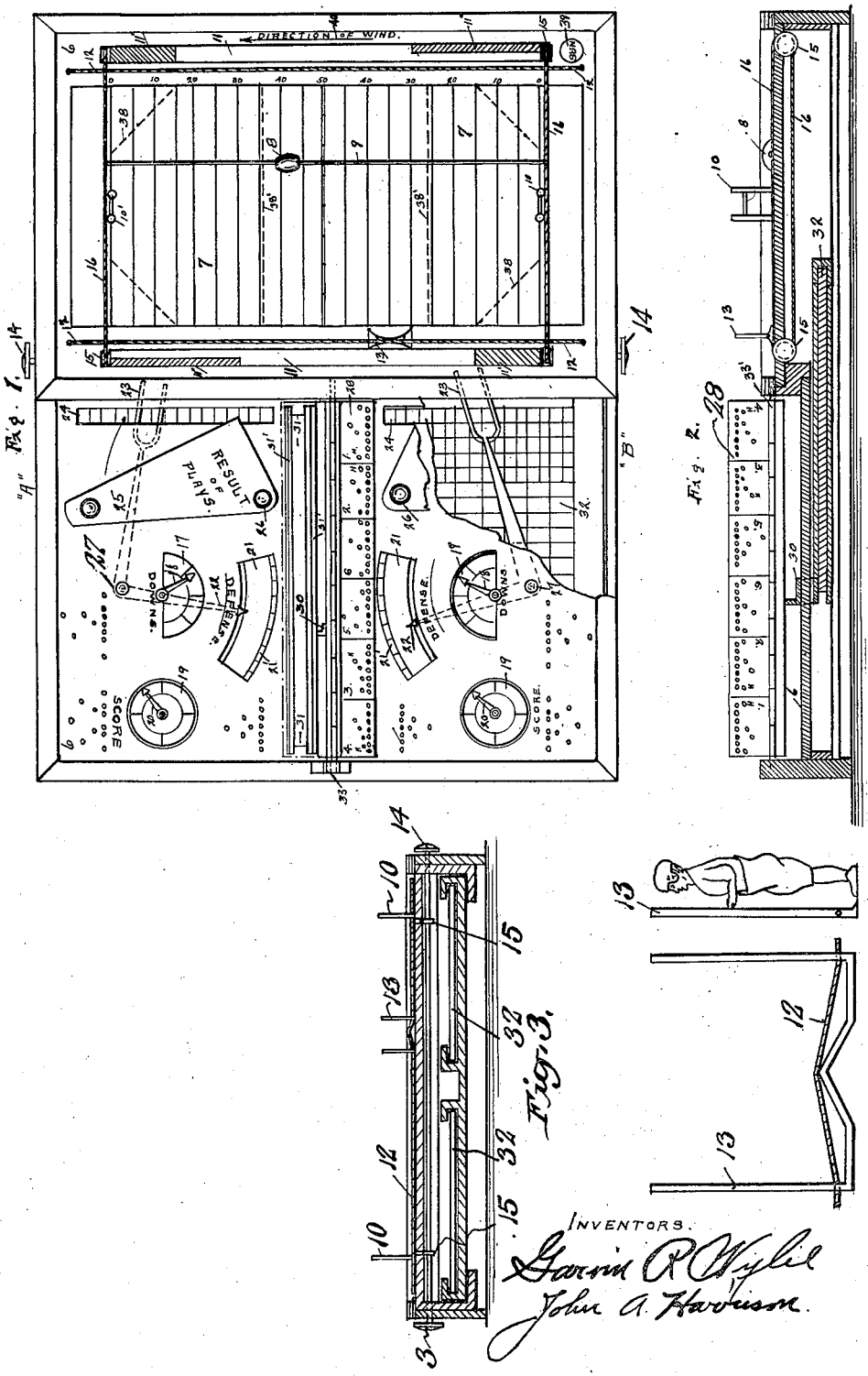

Feb. 15, 1927.

G. R. WYLIE ET AL 1,617,362

EDUCATIONAL GAME

Filed Dec. 31, 1924   4 Sheets-Sheet 2

LINE BUCK DEFENSE.

FORWARD PASS +
END RUN DEFENSE.

PUNT DEFENSE

INVENTORS.
Garvin R Wylie
John A. Harrison

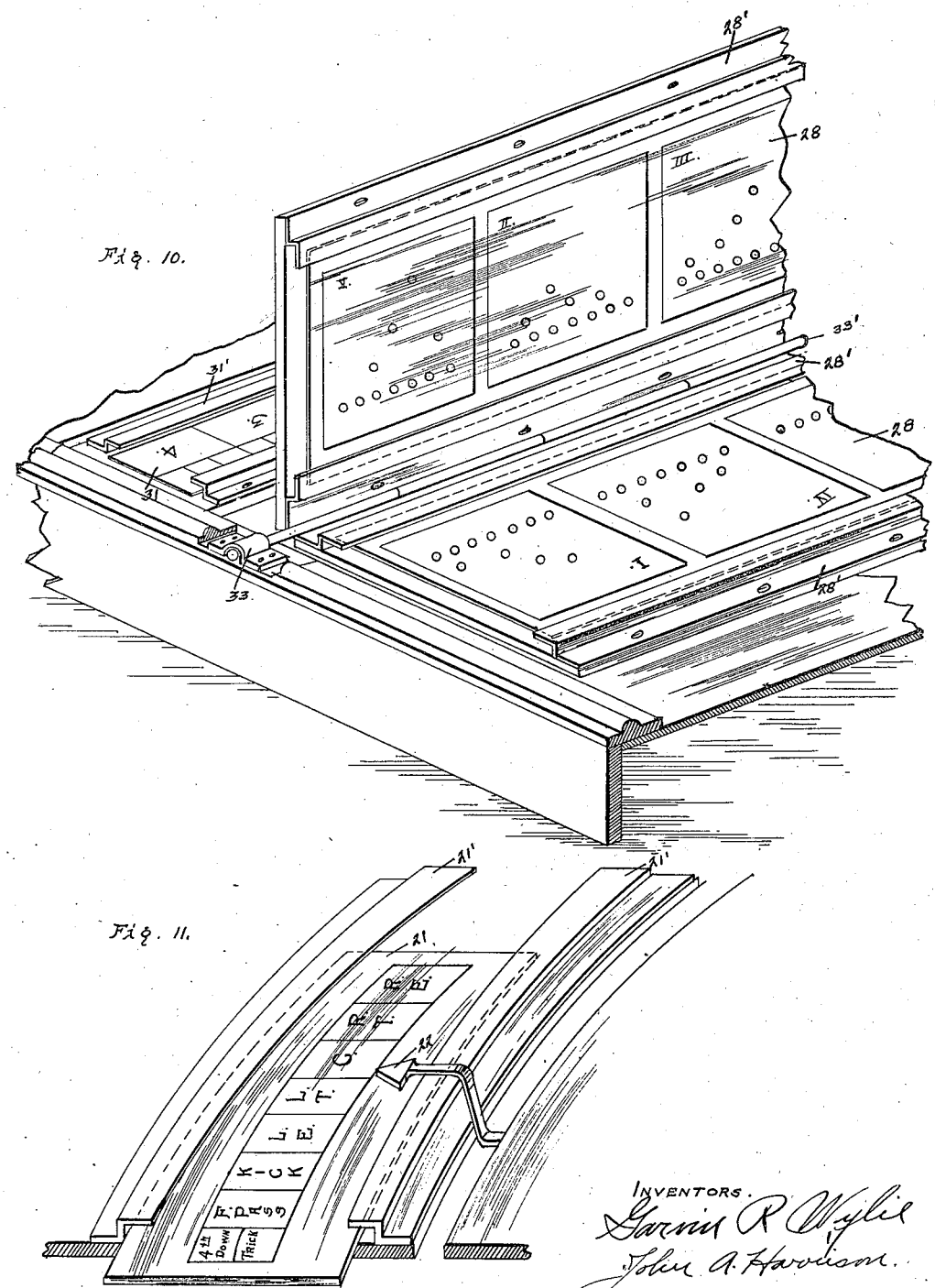

Feb. 15, 1927.

G. R. WYLIE ET AL 1,617,362

EDUCATIONAL GAME

Filed Dec. 31, 1924    4 Sheets-Sheet 4

INVENTORS.
Garvin R Wylie
John A. Harrison

Patented Feb. 15, 1927.

1,617,362

UNITED STATES PATENT OFFICE.

GARVIN R. WYLIE, OF WASHINGTON, AND JOHN A. HARRISON, OF PARNASSUS, PENNSYLVANIA.

EDUCATIONAL GAME.

Application filed December 31, 1924. Serial No. 759,073.

This invention relates to an improved educational apparatus and parlor game. The principal objects of this invention are to provide an attractive and interesting parlor football game and a means of giving instruction in the art of offensive and defensive football strategy, and to teach the players of the game the rules and fundamental principles that govern the play in an actual football game.

The invention consists of a table or board of flat boxlike construction, upon which is printed the representation of a football field, a means of indicating the division of the football field into zones of defensive play, with a ball adapted to be moved in the direction of the length and breadth of said field and a movable slide upon which is printed the results of plays. An indicating device is secured to this slide that enables the offensive players to select the play he desires to make. There are shields so placed and mounted, that the intended play by the offensive player is concealed from the defensive player. An indicator, to be operated by the defensive player, is so constructed and so mounted that it indicates both the selected defense of the defensive player and the result of the combined offensive and defensive play. A means of indicating the formation of the offensive team, (as in drawings, or to indicate formation of defensive team, either or both), together with such features that go to make up a device upon which a complete game of football may be played, will be hereinafter described.

The game of football as played in schools and colleges is governed by a set of rules which are called official. The purpose is to provide an apparatus that will permit the playing of a game of football by two or more persons, the game being governed by these official rules.

Provision is made for any and all of the various plays that occur in an actual game of football, together with a means of recording the score, playing time, number of downs, and distance to be gained for first down.

The arrangement of the several parts of this game, as indicated in the drawings, may be changed or modified. Changes in detail may be made together with the use of other letters, symbols, numbers in the indication of formations, plays and results of plays. In fact, the game is designed with the substitution of other formations, plays and results in view, in order that it may be of much use and broad in its application for the teaching of football.

Slide 32, Figure 1, might well be a pivoted member, turned or moved in an arc, or a disk, capable of being turned and stopped at desired positions, or a cylindrical member, or any other shape. This change would in no way be a departure from the spirit of the invention.

In the accompanying drawings:

Fig. 1, is a plan view of our improved football game, showing the arrangement of parts and location of the same.

Fig. 2, is a longitudinal sectional view of game board, showing relative position of parts.

Fig. 3, is a cross-sectional view of game board at its midsection, showing slide and relative position of parts.

Fig. 4, is a side elevation and an end view of the ten yard indicator.

Figure 7:
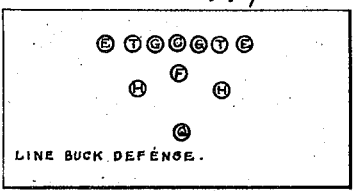
Figure 8:
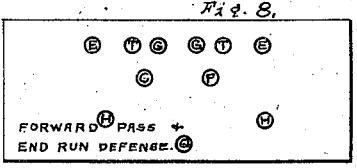
Figure 9:
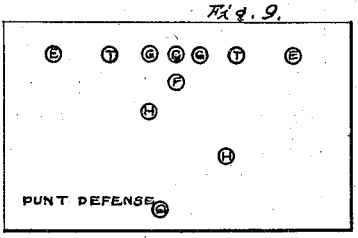

Figures 7, 8, and 9, are views of defensive team formations.

Fig. 10, is an enlarged perspective view of a portion of the shield and its adjacent parts, showing the replaceable feature, together with a portion of the play scale.

Fig. 11, is a similar view of the defense scale, showing the replaceable feature.

Figures 12, 13, 14, and 15, are enlarged views of the ball and its supporting wire (plan and side elevation views), to show method by which the movement of the ball is retarded.

Figures 16, 17, 18, 19, 20, and 21, are face views of our methods of representing team formations and play.

To put our invention into practical form we first provide a frame having therein inclosed a representation of a football field and several movable and operative parts. This table may be of any suitable size and construction best adapted to the purpose. The playing field comprises a printed representation of a football field 7, properly spaced, with goal posts 10—10', at either end, and having zones 11—11', and 11", in colors, white, yellow, and red, paralleling each side. A wire 9, extends from end to end of the field 7, and carries a football 8, slidably mounted thereon, said wire being attached to two lateral cords 16, which are projected over pulleys 15, to a shaft mounted beneath the playing field, and the said shaft fitted at either end with hand knobs 14, which, when revolved, will carry the wire 9, and ball 8, laterally across the football field, 7.

Arranged beneath the playing field, 7, capable of being moved laterally or in the direction of the length of the table, is a slidable member 32, (see Figures 1, 2, 3, 5 and 6), having printed thereon, a separate set or series of letters and symbols, one for each side of the table. These letters or symbols may be read through openings 24, and are separated, the one from the other, by lines, the heavy lines separating and indicating different plays and the letters opposite said plays indicate the different colors used to identify the zones in which play is made, as W $\pm$ Y - R. W. $\pm$ R. W. Y. - etc. indicate white; yellow; red and white; red, white, and yellow, etc. Attached to this slide is a finger piece 30, which projects upward through a slot formed in the floor and always within reach of the offensive player, he being the only one using the slide. The openings 24, above mentioned, are each provided with a pivoted double pointer, the one end indicating the results of plays on the sliding member 32, and the other end 22, the choice of defense, the latter end projecting upward through the floor and within reach of the defensive player.

Located between the openings 24, are two printed scales 31, representing the choice of plays, any one of which may be selected and indicated by the offensive player, by means of the finger piece 30, by which the slidable member is operated. It will be noticed (see Figures 1, 2, and 10) that one of these scales is concealed by hinged members, mounted in bearings 33, and formed in two parts 28, which will stand at right angles. This hinged member 28, may be turned over to expose the second scale when the football changes hands, or the same may be folded flat when the apparatus is not in use.

It will be observed that the formations printed upon each side of section 28, and numbered 1 to 6, inclusive, and in the position shown at Figures 1 and 2, are out of the view of the offensive player. Therefore it is necessary that the players must memorize these formations. The players, as the game progresses, keep record of the number of downs by means of the pointer 18, and schedule 17, and in the same manner a record is kept of the number of points scored by the pointer 20, and dial 19. The 50 yard line of the football field 7, is subdivided to enable the lateral movement of the ball to be measured. A ten yard indicator 13, is arranged to slide along a fixed cord 12, and may be moved at will as the game progresses. The dotted lines 38 and 38' (Fig. 1) outline areas from which field goals are possible, or allowed in our game.

The features whereby other play scales, other formation cards, other play cards, and other defensive scales may be substituted for those shown, are illustrated in the drawings and consist merely of slots and slides, and need no explanation.

The game is played by two persons, one at either side of the playing board. The player who has possession of the ball is designated as the offensive player and the other as the defensive player.

In playing the game, aside from the actual physical encounter, the offensive player must do everything that a quarter-back would be required to do in directing offensive team play. The defensive player must devise means by diagnosing offensive plays, to prevent the offensive player from gaining ground, just as though he were directing the defense in an actual game.

Each player has at his command on the offense, an offense of equal power and on the defense, a defense capable of stopping an offensive play. The success of either player will depend entirely upon his knowledge of football, his ability to use advantageously the means at his disposal, and his ability to outgeneral his opponent on both offense and defense.

Years of experience and observation in football are embodied in this game and govern the results of plays. This experience is put in a form that will entertain and teach the player the very thing that can only be learned through years of experience as a player participating in actual games.

By playing this game, knowledge is acquired of rules governing the play, and of football formations, both in remembering them by numbers (as does a quarter-back), in learning when and where to use each formation, together with the plays that are most successful from them in certain parts of the field, under certain conditions and against different types of defensive play; thus teaching alertness, sure thinking, etc., and providing excellent practice in diagnosing football plays.

*To play the game.*

The two players (hereafter designated as A and B) are seated on opposite sides of the game board 6, as shown in Figure 1. They face each other and toss a coin, or in some other manner suitable to them, determine who shall have the privilege of kicking off or of receiving the kick-off.

Player A wins the choice and elects to kick off the ball to player B. The ball 8, is moved to the central line of the field 7, by turning knob 14, and slid on wire 9, to the fifty yard line of player A. Player A with his fore-finger shoots ball 8, along wire 9, in the direction of the opponents goal line, endeavoring to have the ball come to rest as near the goal line as possible without going over the line. In case the ball does go as far as the goal line it counts as a touch-back and B is given possession of the ball on his twenty yard line. In this instance the ball comes to rest on B's thirty yard line. It is now B's ball, first down on his own thirty yard line.

The ten yard indicator 13, is moved until one end rests on B's thirty yard line and the other end rests on the forty yard line. This indicator 13, measures and indicates the ten yards that B must gain in four consecutive downs or less to retain possession of the ball, i. e., make first down.

Shields 25, are moved to conceal openings 24. Shield 28 is raised into playing position and tilted to the position exposing playing scale 31, and indicator 30, for use of B, at the same time concealing play scale and indicator from A. Shield 28, remains in this position as long as B has possession of the ball. When A has possession of the ball the shield 28, is tipped to the other side exposing playing scale to A.

Player B decides to run left end from formation 5. He moves indicator 30 to space marked 1 on playing scale 31 and small subdivision marked L. E. (left end). B then removes his hand from indicator 30 and calls out "formation five." A glances at shield 28, identifies formation five as the formation B intends to use. He must then quickly decide what play B intends to make, knowing from the position of the players as indicated in formation that B can either punt, forward pass, run either end, or make a quick play through center. A does not fear a punt, he is in doubt however about what B will do. To guard against a long gain he plays back to defend against a possible forward pass. A sets indicator 22 at F. P. on scale 21. Both players having removed their hands from the indicators, player A moves his slide 25, exposing 24. Indicator 23, is found to indicate a certain result. In this case the particular space is divided into two sub-spaces, one of which is yellow and the other is white. In the yellow is the number 2. In the white the number 3. The yardage gained by B is determined by the location of the ball, when the play was made, in respect to the division of the field into its zones of defense. The color of the zone indicating device 11, on the right of the advancing ball 8, determines the color in 24, of the space in which to read the result of the play. This white space is read, indicating that B made a gain of three yards at his left end. B moves the ball 8, forward a distance of three yards and to his left two spaces. Spaces are indicated on the fifty yard line.

Player A replaces shield 25, over opening 24. Player elects to play through center, using formation four. B moves indicator 30, along scale 31, to space four, division 6 (center), calling out "formation four." Player A properly diagnoses the play as a play through center, moves indicator 22, to division of 21, (marked c, center). On moving shield 24, the result of the play is indicated by 23, as—2, indicating that B lost two yards. Ball 8, is moved two yards backward by B and shield 25, placed over opening 24. It is now third down and nine yards to gain.

Player B decides to punt and moves indicator 30, to one of the punt divisions in section one of scale 31. B then calls out formation five. A moves indicator 22, to division K of scale 21, moves 25, and finds that indicator 23, shows that the ball was kicked and downed at a distance of thirty-five yards from its position at the beginning of the play.

It is now A's ball, first down, on his own thirty-four yard line. A elects to use a trick play from formation four, and run right end. (Trick play will be explained hereinafter). Player B is deceived, thinking play will be at the center, sets indicator 22, at "c." When 25, is moved it is found that A gained 12 yards at right end, making first down on A's forty-six yard line. A moves the ball 8, forward a distance of twelve yards and to the right two spaces, as indicated on fifty yard line.

A decides to try a short forward pass from formation five, moves indicator 30, on play scale 31, to one of forward pass subdivisions of formation five and calls out formation five. B diagnoses the play and moves indicator 22, to F. P. on scale 21. On moving 25, it is found that the forward pass was incomplete. A then makes a play at center from formation five. B again defends against forward pass. A gains eight yards at center as a result. Third down and two yards to go. A elects to try a forward pass from formation five. B falls into the trap and plays to defend against another play at center. Player A succeeds in completing a thirty yard forward pass, making it first down on B's sixteen yard line. Using formation two, A gains three yards at center, B expecting a play at right tackle. The ball 8, is now within the fifteen yard line, and indicator 11, indicates that figures shown in yellow spaces 24, will now represent gains or losses by A. A again endeavors to play center from formation five. B diagnoses the play and A loses four yards as a result. A again calls formation five, endeavoring to forward pass. B again diagnoses the play and the forward pass is incomplete. Fourth down and eleven yards to gain. A decides to try for a field goal, using formation five. The play is obvious to B. B defends against kick and in this instance the try results in a touchback. B is given possession of the ball 8, on his own twenty yard line.

The above show the possibilities of the game. Player B was led into a trap by A who almost scored on a long forward pass. Player A then uses poor judgment in choice of plays and formations when within the fifteen yard line and as a result failed to score.

A book of rules explaining details of play will be furnished with each game. A time limit is set for the playing of the game and a third player may act as referee.

The ten yard indicator 13, is moved as each first down is made; record is kept of the number of downs 17, and score 19.

The fifty yard line is divided into spaces in a lateral direction, in order that the lateral movement of the ball 8, may be measured. An end run moves the ball 8, two spaces, a tackle play one space and a forward pass one space, as indicated on 31, or in the direction of the most distant side line of the football field.

On the slide or playing element 32, defensive zones are indicated either in colors corresponding to indicated zones 11, 11', 11", of playing field or in some other manner that will enable the player to identify the proper results of a play when made in different parts of the football field 7.

Figure 5:
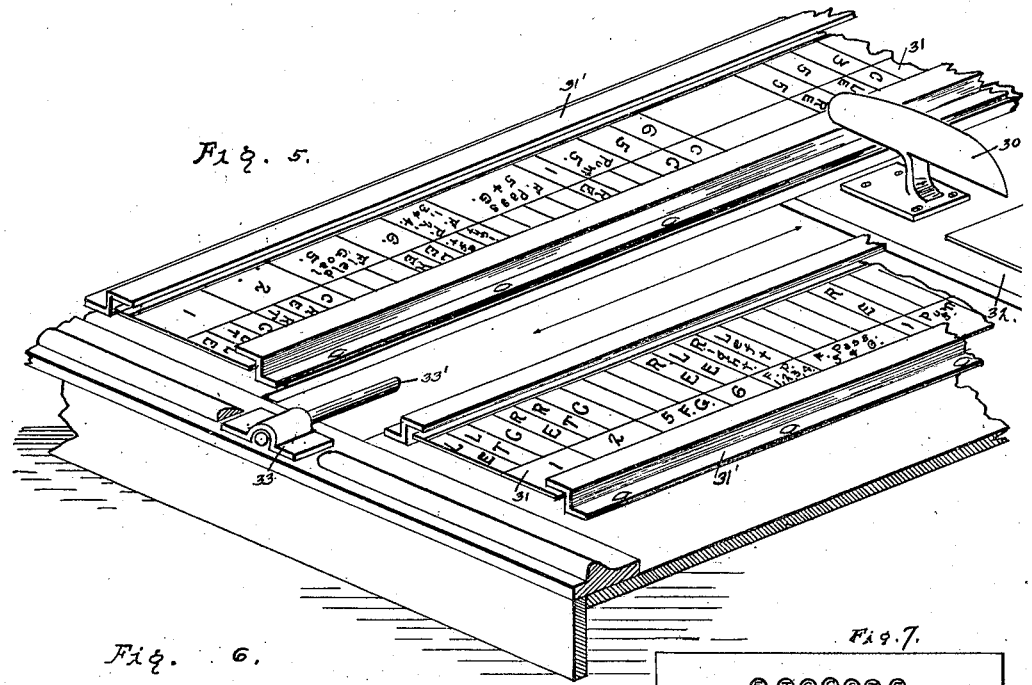
Fig. 5, is an enlarged perspective view of the offensive playing scale, the shield being removed to show replaceable feature and play indicator.

In making a forward pass from a certain formation, see Fig. 5, scale 31, four spaces are available for use. The results from the use of these different spaces vary and represent results that might be expected from forward passes of various kinds. Some result in long gains, some in short gains. If anticipated by the defense, some are incomplete and some are intercepted.

In making kicks the same choice of one of several spaces on scale 31, is permitted.

From a number of formations trick plays may be made, including triple passes, resulting in plays at some poorly defended point, and forward passes. A trick play, to succeed, must be a surprise.

The subdivision of play scale used for making trick plays on any down, or line plays on fourth down from formations are always located at some distance on the playing scale from the position of the subdivisions used for making the regular plays from the same formation; this gives the defensive player some warning if he is alert.

A special division or defensive scale is alloted to defend against the trick play or line play on fourth down which always makes the trick play hazardous for offensive player if anticipated by defensive player.

At the four corners of the football field 7, are dotted lines 38, that mark off corner portions of the football field, from which it is not permitted that field goals be attempted.

Field goals are made with varying degrees of success from two indicated zones on field 7, namely zero yard to fifteen yard line and fifteen yard to thirty-one or thirty-six yard line.

Punts are not made within the opponents fifteen yard line. There is a special zone shown and indicated on one half of the width of 11, that applies alone to results of forward passes and of punts. It extends from the zero yard to the thirty yard line of the player in possession of the ball. It represents a danger zone for an offensive team. Special care must be exercised and no chances taken either in blocked punts on fourth down or intercepted forward passes.

All plays made in football can be represented by this game device. By substituting for scale 31, shield 28, and slide 32, any style of football play can be represented. Play between evenly matched teams or unevenly matched teams, or teams using different styles of play. This makes the game of wide application and of great value in teaching football principles to players.

Figure 6:
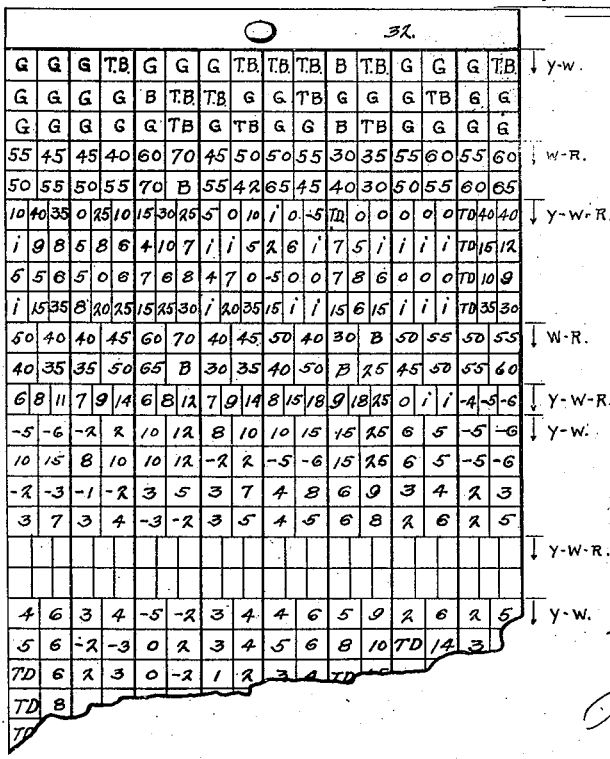
Fig. 6, is a plan view of one of the two play cards used in slide.
Figure 18:
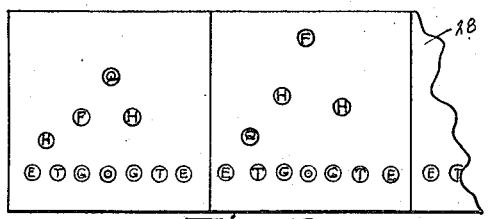
Figure 21:
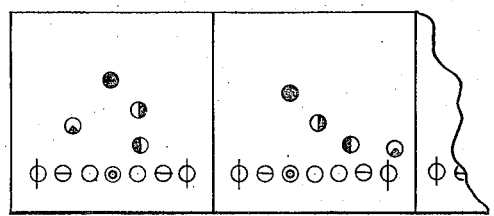

The direction of the wind is indicated by an arrow 40 at side of football field, and the position of the sun 39 indicated at one corner of playing board. The effect of these factors upon the making of kicks and forward passes is taken care of in the results printed upon play cards (Fig. 6). While the effect of the wind on the kick off (when the football ball 8 is shot along wire 9) is represented by having a small bend or several bends or a thick place (Fig. 13) or some other obstruction on the wire 9 at the point desired to retard the progress of the ball when shot. Means of distinguishing the different individual players is illustrated in Figs. 18, 20, and 21 and needs no explanation other than that the device is thought to be of much value in representing the various players who play in their respective positions by reason of their ability to execute certain plays better than their fellow players, for instance the fullback, is the best man to buck the line, while a halfback runs the ends etc., and by studying the positions of these players in formations one is able to better diagnose the play to be made.

Figure 17:
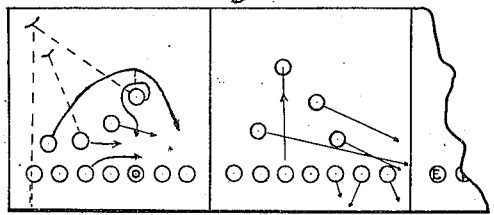
Figure 16:
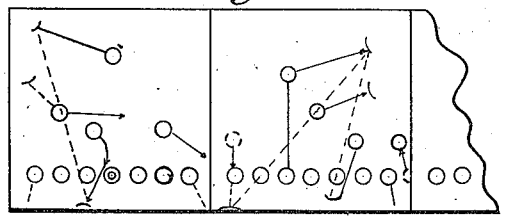

Figures 16 and 17 show means of indicating the direction of motion of the players at the start of the play and enables defensive player to better diagnose the play. These arrows are in black for regular plays, and a red arrow (not indicated) indicates the trick play from the same formation.

Figure 20:
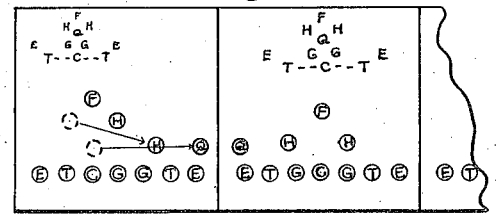
Figure 19:
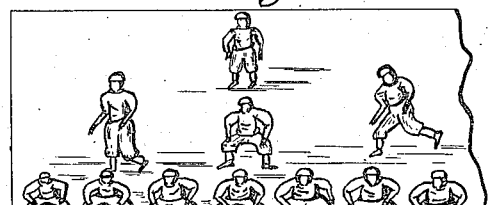
Figure 15:
Figure 14:
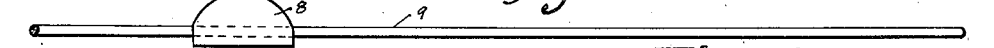
Figure 13:
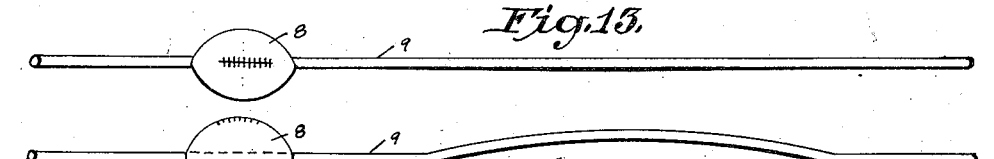
Figure 12:

Figure 20 illustrates a means of representing a certain type of shift play, the letters, the position of players before the shift, and the diagrams and arrows the position assumed by the players the instant before the ball is snapped. This feature serves to instruct the defensive player in the proper method of meeting such plays. In using the type of play given here, only a very short time is allowed the defensive player to set indicator after formation is called. Figure 19 illustrates our means of indicating the direction of a play by the pictorial method. This is the most realistic method and for that reason should be of value in accustoming the players in what to expect in an actual game.

The defensive formation shown in Figures 7, 8, and 9, are to graphically show the players the formation that a defensive team assumes to stop certain types of play. These formations are only tentative and others may be substituted as desired. Fig. 7 is a defense against a play directed at the line between the tackles. Fig. 8 is a defense assumed to receive an expected punt. These formations serve to show graphically why a certain type of offensive play succeeds or fails when met by a certain type of defensive play.

Having thus described our invention, we claim:

1. In a game a representation of a football field, a ball adapted to operate over said field in four directions, and means representing the position of the sun, and effect upon play.

2. In a game a representation of a football field, a ball adapted to operate over said field in four directions, and means representing the direction of the wind, and effect upon play.

3. In a game a representation of a football field, a ball adapted to operate over said field in four directions, and a means representing the position of the sun and a means representing the direction of the wind, and effect upon play.

4. In a game a representation of a football field, a ball adapted to operate over said field in four directions, and a means representing offensive and defensive play on fourth down.

5. In a game a representation of a football field, a ball adapted to operate over said field in four directions, and means representing direction of movement of players in formations.

6. In a game a representation of a football field, a ball adapted to operate over said field in four directions, and means representing individual players in formations.

7. In a game a representation of a football field, a ball adapted to operate over said field, in four directions, and means representing trick plays from formations.

8. In a game a representation of a football field, a ball adapted to operate over said field in four directions, and means representing shift formations.

9. In a game a representation of a football field, a ball adapted to operate over said field in four directions, and means for governing the effect of the wind on the ball on the kick-off.

10. In a game a representation of a football field, a ball adapted to operate over said field in four directions, means of substituting other formations, and means of substituting other playing scales.

11. In a game a representation of a football field, a ball adapted to operate over said field in four directions, means of substituting other formations, and means of substituting other results of plays.

12. In a game a representation of a football field, a ball adapted to operate over said field in four directions, and means of substituting other formations.

13. In a game a representation of a football field, a ball adapted to operate over said field in four directions, and means of substituting other defensive playing scales.

14. In a game a representation of a football field, a ball adapted to operate over said field in four directions, and means of indicating the formation of the defensive team.

15. In a game, a representation of a football field, a ball adapted to operate over said field, and a means representing team formations in such form as will indicate to the players, the formations of the offensive and defensive teams for each play made.

GARVIN R. WYLIE. [L. S.]
JOHN A. HARRISON. [L. S.]